United States Patent
Soubramanien et al.

(10) Patent No.: US 9,141,794 B1
(45) Date of Patent: Sep. 22, 2015

(54) PREEMPTIVE AND/OR REDUCED-INTRUSION MALWARE SCANNING

(75) Inventors: Viswa Soubramanien, Santa Clara, CA (US); Shaohong Wei, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1708 days.

(21) Appl. No.: 12/401,160

(22) Filed: Mar. 10, 2009

(51) Int. Cl.
  *G06F 21/56* (2013.01)
  *G06F 1/32* (2006.01)
  *G06F 9/50* (2006.01)

(52) U.S. Cl.
  CPC ........... *G06F 21/56* (2013.01); *G06F 1/329* (2013.01); *G06F 9/505* (2013.01); *G06F 9/5038* (2013.01); *G06F 21/566* (2013.01)

(58) Field of Classification Search
  CPC ....... G06F 21/56; G06F 21/566; G06F 9/505; G06F 9/5038; G06F 1/329
  See application file for complete search history.

(56) References Cited

U.S. PATENT DOCUMENTS

| | | | |
|---|---|---|---|
| 6,301,668 B1 * | 10/2001 | Gleichauf et al. | 726/25 |
| 6,802,012 B1 * | 10/2004 | Smithson et al. | 726/24 |
| 6,968,461 B1 * | 11/2005 | Lucas et al. | 726/22 |
| 7,310,818 B1 | 12/2007 | Parish et al. | |
| 7,854,007 B2 * | 12/2010 | Sprosts et al. | 726/24 |
| 2007/0079377 A1 * | 4/2007 | Pagan | 726/24 |
| 2008/0295176 A1 * | 11/2008 | Holostov et al. | 726/24 |

OTHER PUBLICATIONS

Davis, C., "Norton 360's Smart Scheduler," Apr. 6, 2008, last edited Jan. 19, 2009, Norton.com, accessed on Jun. 21, 2011 [http://community.norton.com/t5/Norton-Protection-Blog/Norton-360-s-Smart-Scheduler/ba-p/334].*
Rubenking, M., "Norton 360 version 2.0," Mar. 13, 2008, PCMag.com, accessed on Jun. 21, 2011 [http://www.pcmag.com/article2/0,2817,2275822,00.asp].*
Norton 2009: A message from the performance team, pp. 1-4, Sep. 9, 2008 [retrieved on Mar. 10, 2009], retrieved from the Internet: http://community.norton.com/t5/Norton-Protection-Blog/Norton-2009-A-message-from-the-performance-team/ba-p/23107.

* cited by examiner

*Primary Examiner* — Robert Leung
(74) *Attorney, Agent, or Firm* — Okamoto & Benedicto LLP (57) ABSTRACT

One embodiment relates to a computer-implemented method of preemptively scanning targets for malicious codes. Input qualities regarding said targets are received. A first computer-implemented procedure is applied to generate a measure of priority for scanning of said targets. Targets are selected for preemptive scanning using said measure of priority. In addition, resource utilization inputs may be received, and a second computer-implemented procedure may be applied to determine a system resource usage level using the resource utilization inputs. In that case, the malware scanning may be performed opportunistically based on the system resource usage level. Other embodiments, aspects and features may also be disclosed.

14 Claims, 7 Drawing Sheets

PREEMPTIVE AND/OR REDUCED-INTRUSION MALWARE SCANNING

BACKGROUND

1. Technical Field

The present invention relates generally to computer security, and more particularly, but not exclusively, to methods and apparatus for scanning computer data for malicious contents.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as malware or "viruses." Malware scanning or "antivirus" products for protecting computers against malicious codes are commercially available. Experienced computer users have installed some form of antivirus in their computers.

A typical malware scanning product includes a scan engine and a pattern file. The pattern file comprises patterns for identifying known malicious codes. To check a file for malicious code, the scan engine opens the file and compares its content to patterns in the pattern file. The pattern file needs to be updated to address newly discovered malicious codes. As the number of known malicious codes increases, so does the size of the pattern file. The larger the pattern file, the more memory and processing resources are consumed to perform malicious code scanning.

SUMMARY

One embodiment relates to a computer-implemented method of preemptively scanning targets for malicious codes. Input qualities regarding said targets are received. A first computer-implemented procedure is applied to generate a measure of priority for scanning of said targets. Targets are selected for preemptive scanning using said measure of priority.

In another embodiment, resource utilization inputs are also received, and a second computer-implemented procedure may be applied to determine a system resource usage level using the resource utilization inputs. In this case, the malware scanning may be performed opportunistically based on the system resource usage level.

Another embodiment relates to an apparatus configured to scan targets for malicious code. Data storage is configured to store computer-readable code and data, and a processor is configured to execute computer-readable code and to access said data storage. A scheduling engine is configured to receive input qualities regarding said targets and apply a first computer-implemented procedure to generate a measure of priority for scanning of said targets. In addition, a scan manager is configured to select targets for preemptive scanning using said measure of priority.

In another embodiment, the apparatus also includes a resource monitor which is configured to receive resource utilization inputs. The resource monitor is further configured to apply a second computer-implemented procedure to determine a system resource usage level using the resource utilization input. In this case, the scan manager may be further configured to opportunistically schedule malware scanning based on the system resource usage level.

These and other features of the present invention will be readily apparent to persons of ordinary skill in the art upon reading the entirety of this disclosure, which includes the accompanying drawings and claims.

BRIEF DESCRIPTION OF THE DRAWINGS

The use of the same reference label in different drawings indicates the same or like components.

DETAILED DESCRIPTION

Disadvantages and Problems of Conventional Malware Scanning

Malware scanning products generally scan targets to determine whether they contain malware (including computer viruses, worms, and so on) or lead to malicious sites. As used herein, a "target" for malware scanning may be a file or universal resource locator (URL). A target may be scanned locally by the host computer system or remotely by way of an in-the-cloud look-up or scan.

In existing malware scanning products, targets are generally scanned either when they are created or modified, or when they are opened. Applicants believe that this conventional method of scanning has the following disadvantages and problems.

First, the conventional method of scanning requires an increasingly large amount of resources of a computer system. When the targets are scanned, the scanning process typically uses a significant amount of CPU and memory resources. The amount of system resources required for malware scanning is increasing with the increasing size of files and disk storage systems. This disadvantageously reduces the amount available to other applications and frequently results in noticeably slower performance of those other applications.

Second, the conventional method of scanning results in inefficient repetitive scanning. For example, the conventional method scans a file each time it is accessed. Hence, when a file is accessed multiple times, it is scanned multiple times, even if the file is unmodified between scans and there are no intervening updates to the security software.

Third, malware scanning may have latencies due to the need to access network resources. For example, a security product may perform an in-the-cloud look-up of a knowledge base to determine a reputation of a specific target. Such a look-up typically slows down the scanning process due to network latencies. As a result, performance is further impacted from the point of view of a user.

Fourth, the intrusive nature of malware scanning often results in incomplete scans. This is because a user often prefers not to complete a scan (whether manual, on-demand, or scheduled) because the system is practically unusable during the scan. As a result of incomplete scans, the system becomes more vulnerable to malware attacks.

Reduced-Intrusion Malware Scanning

One embodiment of the present invention provides a method and apparatus for preemptive scheduling of targets for malware scanning. The scheduling of targets for scanning is done in a preemptive way based on a set of qualities for the targets. The set of qualities may include one or more properties of the target which provide predictive value as to how soon the target would conventionally need to be scanned, for example, due to the target being accessed. Another embodiment of the present invention provides a method and apparatus for opportunistic malware scanning. The opportunistic malware scanning is performed based upon monitoring of system resource usage. In another embodiment of the present invention, the opportunistic malware scanning may be combined with the preemptive scheduling of targets for malware scanning.

Figure 1:
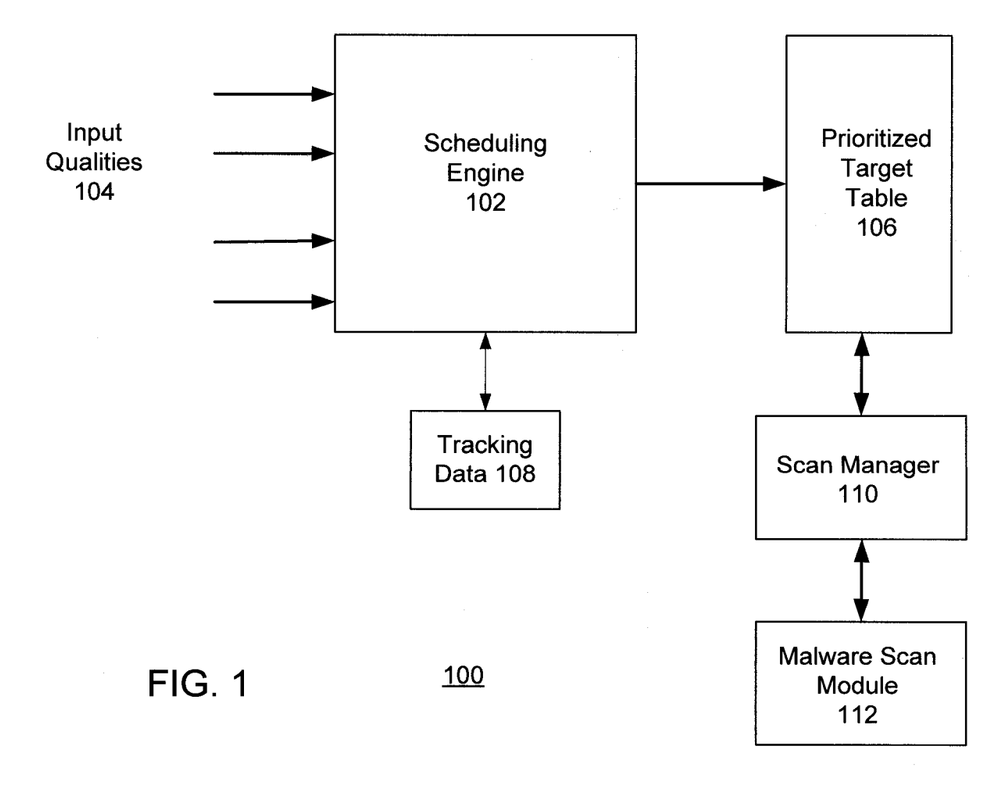
FIG. 1 is a schematic diagram depicting an apparatus for preemptive scheduling of malware scanning in accordance with an embodiment of the invention.

FIG. 1 is a schematic diagram depicting an apparatus for preemptive scheduling of malware scanning in accordance with an embodiment of the invention. As shown, a scheduling engine 102 is configured to receive "input qualities" 104 regarding targets for malware scanning. The scheduling engine 102 is further configured to determine weights (or scores) for the scan targets based on the input qualities 104. In one implementation, the scheduling engine 102 may utilize an external module or application for collecting, or for assisting in collecting, the input qualities 104.

The input qualities 104 may include one or more of the following: the frequency at which a target has been accessed; the last time at which the target's content was modified; the frequency at which the target's content has been modified; an estimation of the likelihood of the target carrying malware (this may be based on file type, for example); an estimation of time and/or CPU resource and/or disk space required to fetch and scan data for the target; a percentage scan completion if a target has been partially scanned; and age of the target's content (for example, based on time-to-live or TTL data).

In addition, the input qualities 104 may include source information and/or information about past scan results for a target. The source information may indicate, for example, that the target was downloaded from an electronic mail message, from a USB device, from a web browser, or by a particular application. The information about past scan results may comprise, for example, an approval rating based on past scan results for the target.

The input qualities 104 may also include other target-related characteristics. These characteristics may include, for example, the file name, file type, file size, file path, and file creation time (for those targets that are files).

The input qualities 104 may further include select target-related events which are tracked by the scheduling engine 102. Such events may comprise, for example, file access events, product updates, and completed scan results. File access events include the use and/or modification of a file. The scheduling engine 102 may track the time of the access, whether the access used and/or modified the file, and which application performed the access. The tracking data 108 may be stored and used by the scheduling engine 102. The monitored events may include, for example, the following system activities: (a) process-related activities, including creating a process, opening a process and terminating a process (cleanup); (b) file-related activities, including creating a file for reading, opening a file for reading, deleting a file (cleanup), creating a file for writing, opening a file for writing, and closing a file; (c) registry-related activities, including creating a registry key or value, setting a registry key or value, and deleting a registry key or value (cleanup); and (d) application programming interface (API) related activities, including calling into an API.

The weights may be used to rank the scan targets. For example, a lower weight may indicate a higher priority target for scanning (i.e. a higher urgency for scanning the target). In that case, a target with a lower weight would rank higher in priority than a target with a higher weight. (In an alternate implementation, a higher weight may indicate a lower priority target for scanning. In that case, a target with a higher weight would rank higher in priority than a target with a lower weight.)

A prioritized target table 106 may be output and/or updated by the scheduling engine 102. The following is a table indicating example information that may be included in the prioritized target table 106.

TABLE 1

| Target | Weight | Estimated Scan Time |
| --- | --- | --- |
| FileR.exe | 10 | 150 |
| FileB.vbs | 11 | 1000 |
| FileM.exe | 14 | 25 |
| FileA.zip | 18 | 5 |
| File2.exe | 27 | 10 |

In Table 1, the weight for a target may be on an arbitrary scale, where a lower weight indicates a higher priority for scanning. The estimated scan time for a target may be in milliseconds (or any other scale).

Of course, other embodiments of the prioritized target table 106 may include fields that vary from the specific fields shown in Table 1. For example, the size of the target may be included instead of the estimated scan time. As another example, in one embodiment, the table may include the weight (priority) field, but not the estimated scan time field. In other embodiments, other additional fields may be included in the table.

The prioritized target table 106 may be used to preemptively select or schedule scan targets by a scan manager 110. For example, the scan manager 110 may be configured to simply select or schedule targets in the order indicated by weight (priority) field in the prioritized target table 106. A malware scan engine 112 performs the scans on the targets.

Figure 2:
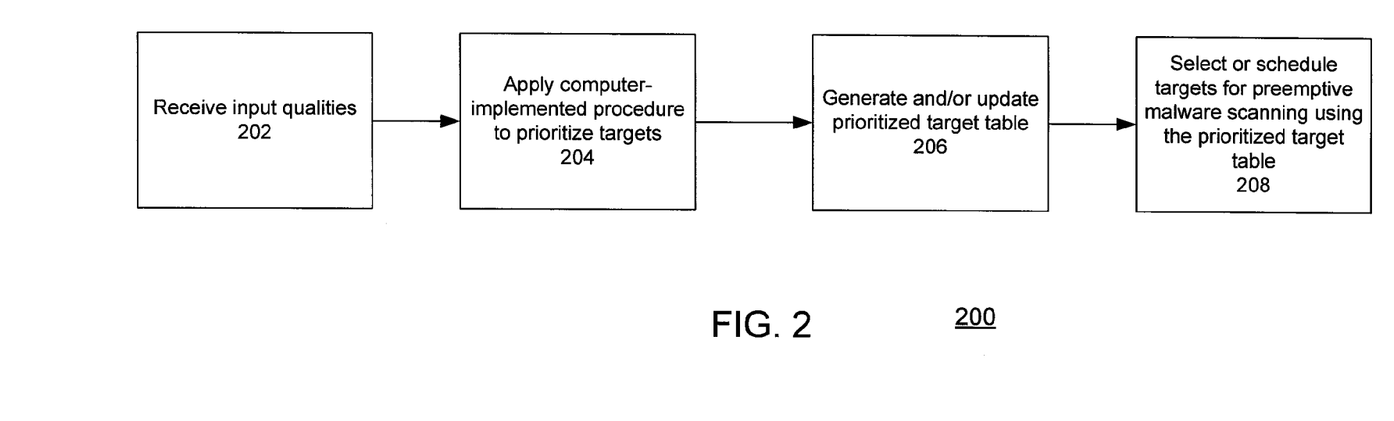
FIG. 2 is a flow chart depicting a method for preemptive scheduling of malware scanning in accordance with an embodiment of the invention.

FIG. 2 is a flow chart depicting a method 200 for preemptive scheduling of malware scanning in accordance with an embodiment of the invention. This method 200 may be performed, for example, using the apparatus 100 described above in relation to FIG. 1.

The input qualities 104 are received 202 by the scheduling engine 102. The scheduling engine 102 applies a computer-implemented procedure 204 to rate targets for preemptive malware scanning. Based on the ratings of the targets, the prioritized target table 106 is generated and/or updated 206. The prioritized target table 106 may be used by the scan manager 110 to select or schedule 208 targets for preemptive scanning by the malware scan module 112.

Advantageously, the preemptive scheduling technique described above enables targets that are more likely to be malware to be scanned before targets that are less likely to be malware. This makes it more likely that malware will be detected earlier by the scanner.

Figure 3:
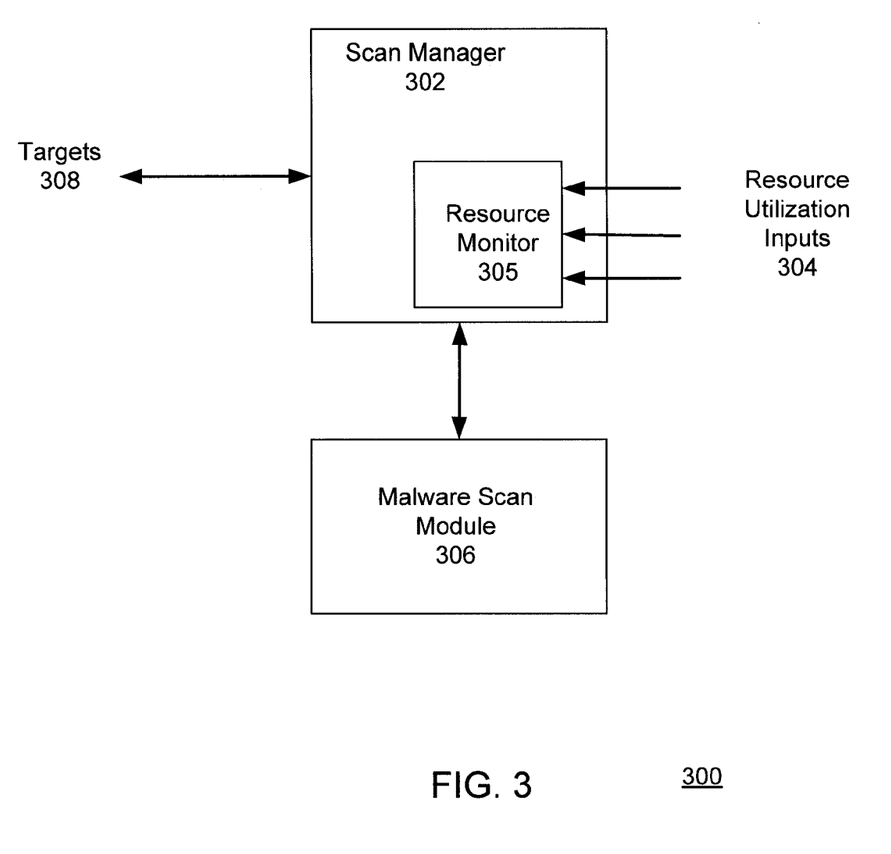
FIG. 3 is a schematic diagram depicting an apparatus for opportunistic malware scanning in accordance with an embodiment of the invention.

FIG. 3 is a schematic diagram depicting an apparatus 300 for opportunistic malware scanning in accordance with an embodiment of the invention. A resource monitor 305 of a scan manager 302 monitors usage of the system resources so as to determine opportunistic times for a malware scan module 306 to perform malware scanning of targets 308 with minimal or reduced impact to the computer user's experience.

In order to perform the monitoring, the resource monitor 305 receives resource utilization inputs 304. The resource utilization inputs 304 may include, for example, CPU usage, memory usage, and disk input/output usage. In addition, the resource utilization inputs 304 may include network bandwidth usage. While the resource monitor 305 is shown as part of the scan manager 302 in FIG. 3, a module external to the scan manager 302 may also be used.

In one embodiment, when the resource monitor 305 detects a low-level of resource usage by the computer system, the malware scanning module 306 may be allowed to perform its scanning of targets 308 in a normal manner. However, when the resource monitor 305 detects a high-level of resource usage by the computer system, the scan manager 302 may be configured to pause the malware scanning of targets during this period of high resource usage. In one implementation, a high-level of resource usage may be indicated when a set usage limit for one or more system resources (for example, the CPU, memory, or disk storage, or network bandwidth for in-the-cloud look-ups) is exceeded.

Figure 4:
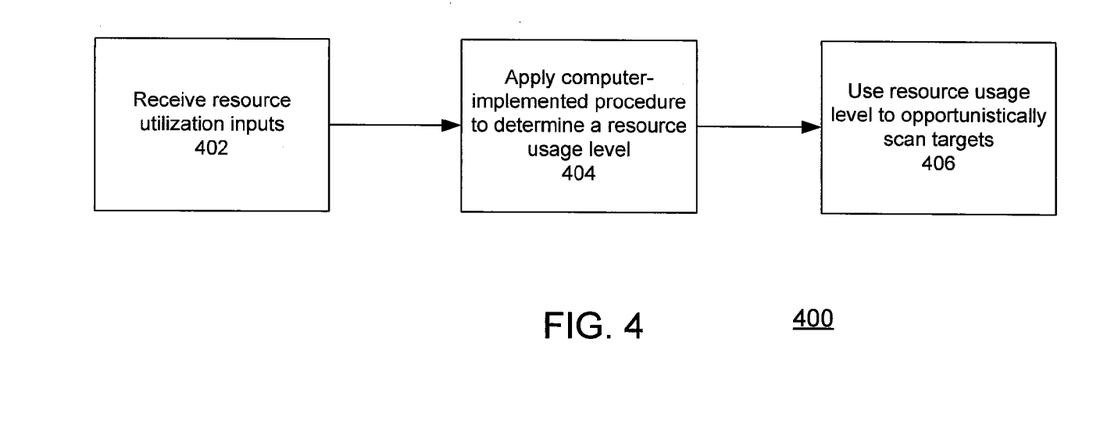
FIG. 4 is a flow chart depicting a method for opportunistic malware scanning in accordance with an embodiment of the invention.

FIG. 4 is a flow chart depicting a method 400 for opportunistic malware scanning in accordance with an embodiment of the invention. This method 400 may be performed, for example, using the apparatus 300 described above in relation to FIG. 3.

The resource utilization inputs 304 are received 402 by the resource monitor 305. The resource monitor 305 applies a computer-implemented procedure 404 to determine a resource usage level (or resource usage levels). The resource usage level(s) may be used 406 by the scan manager 302 to control the malware scan module 306 so as to opportunistically scan targets during periods of lower resource usage.

The opportunistic technique described above enables the malware scanning module 306 to avoid taking up scarce system resources during periods of high resource usage. This advantageously reduces or minimizes intrusion or interference with other processes which a user may be actively running.

Figure 5:
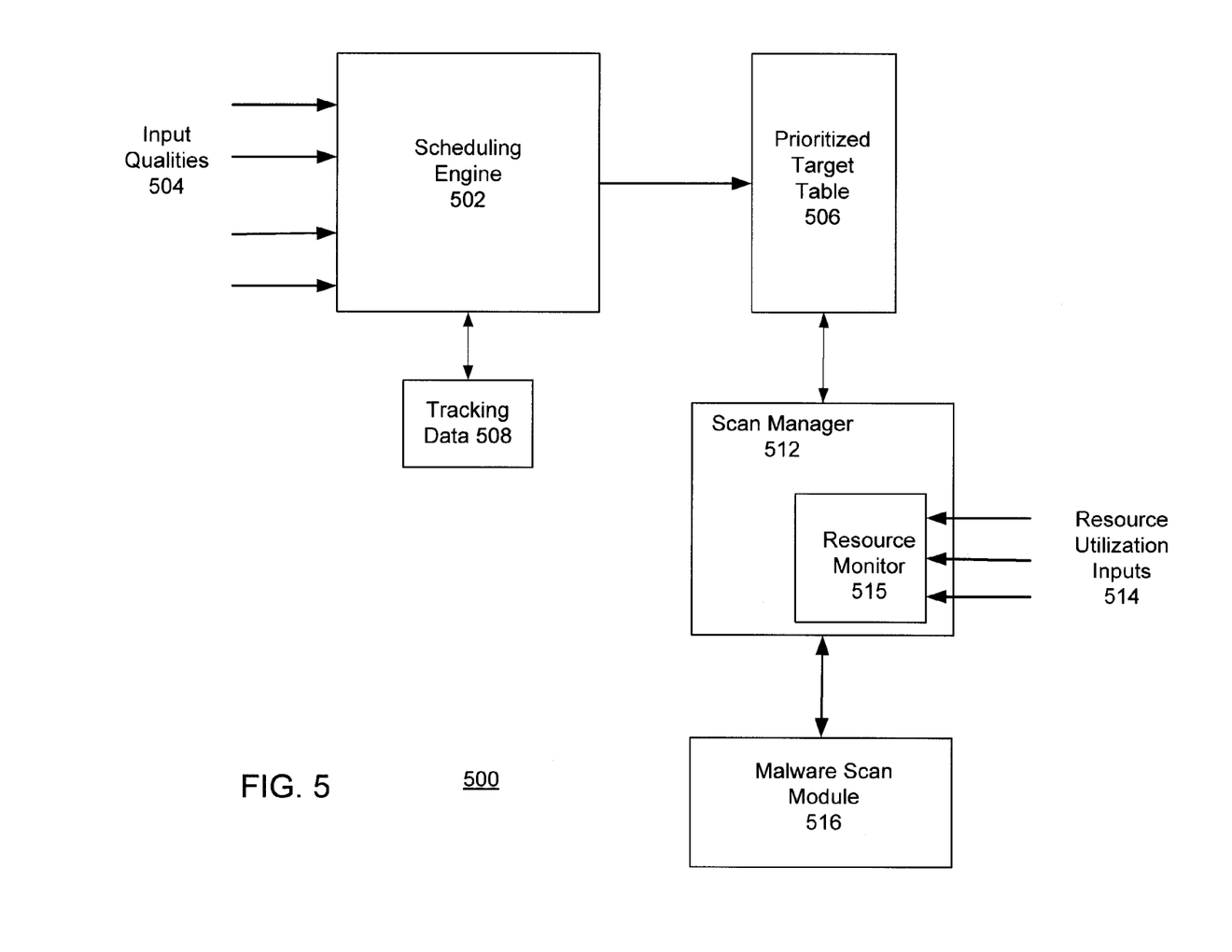
FIG. 5 is a schematic diagram depicting an apparatus for preemptively-scheduled and opportunistic malware scanning in accordance with an embodiment of the invention.

FIG. 5 is a schematic diagram depicting an apparatus 500 for both preemptively-scheduled and opportunistic malware scanning in accordance with an embodiment of the invention. The apparatus 500 of FIG. 5 integrates the preemptive scheduling apparatus 100 of FIG. 1 and the opportunistic scanning apparatus 300 of FIG. 3.

As shown in FIG. 5, a scheduling engine 502 is configured to receive input qualities 504 regarding targets for malware scanning. In one embodiment, the scheduling engine 502 may utilize an external module or application for collecting, or for assisting in collecting, the input qualities 504. The scheduling engine 502 is further configured to determine weights (or scores) for the scan targets based on the input qualities 504. The input qualities 504 may include various target-related data and characteristics and may further include select target-related events which are tracked by the scheduling engine 502. The tracking data 508 may be stored and used by the scheduling engine 502. A prioritized target table 506 may be output and/or updated by the scheduling engine 502. For example, as shown above in Table 1, the prioritized target table 506 may include the weight for a target, where a lower weight indicates a higher priority for scanning, and the estimated scan time for a target. Of course, other embodiments of the prioritized target table 506 may include fields that vary from the specific fields shown in Table 1.

As further shown in FIG. 5, a resource monitor 515 of a scan manager 512 monitors usage of the system resources. The monitoring is performed so as to determine opportunistic times for a malware scan module 516 to perform malware scanning of targets with minimal or reduced impact to the computer user's experience. In order to perform the monitoring, the resource monitor 515 receives and processes resource utilization inputs 514. The resource utilization inputs 514 may include, for example, CPU usage, memory usage, disk input/output usage, and/or network bandwidth usage. While the resource monitor 515 is shown as part of the scan manager 512 in FIG. 5, a module external to the scan manager 512 may also be used.

Figure 6:
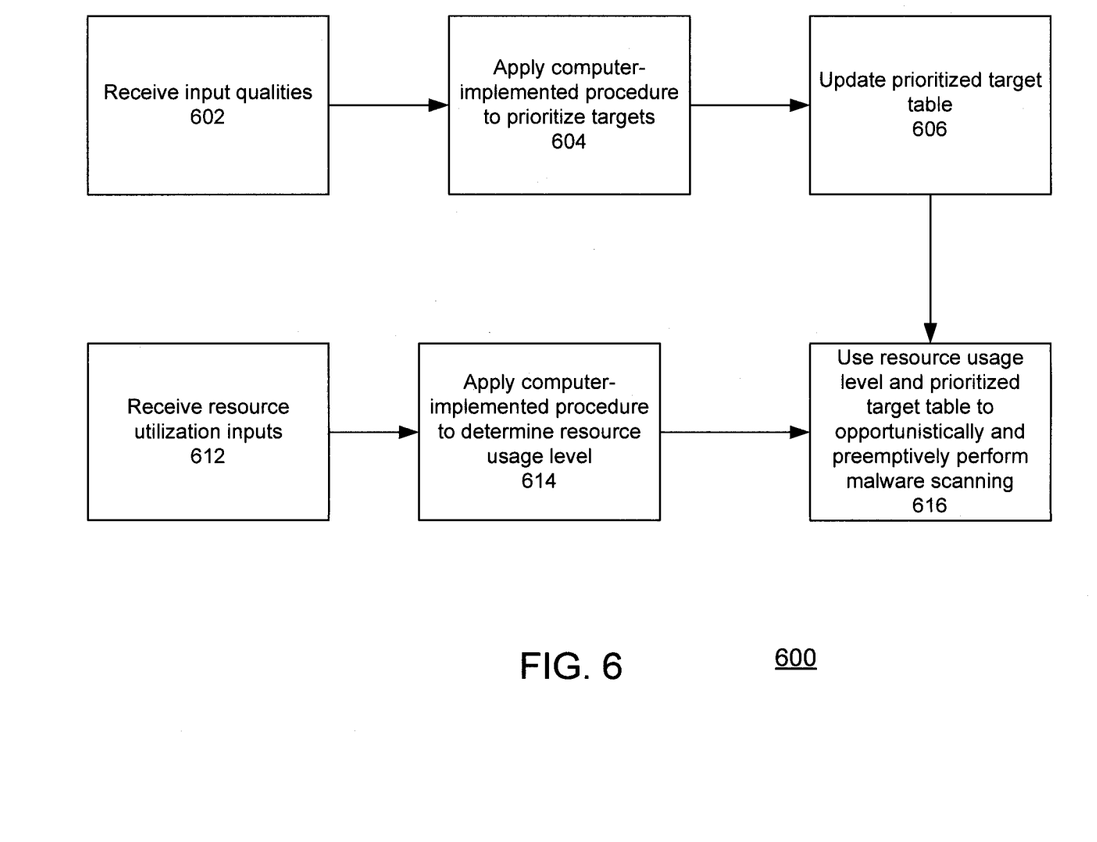
FIG. 6 is a flow chart depicting a method for preemptively-scheduled and opportunistic malware scanning in accordance with an embodiment of the invention.

FIG. 6 is a flow chart depicting a method 600 for preemptively-scheduled and opportunistic malware scanning in accordance with an embodiment of the invention. This method 600 may be performed, for example, using the apparatus 500 described above in relation to FIG. 5.

The input qualities 504 are received 602 by the scheduling engine 502. The scheduling engine 502 applies a computer-implemented procedure 604 to prioritize targets. Based on the ratings of the targets, the prioritized target table 506 is generated and/or updated 606.

In addition, resource utilization inputs 514 are received 612 by a resource monitor 515 of a scan engine 512. The resource monitor 515 applies a computer-implemented procedure 614 to determine a system resource usage level (or levels) using the resource utilization inputs 514.

The resource usage level(s) and the prioritized target table are used 616 by the scan manager 512 so that malware scanning is performed in a preemptive and opportunistic manner. For example, consider the following cases.

In a first case, the resource monitor 515 may detect that usage of resources by the computer system indicates a low-level of usage. In this case, the scan manager 512 may select as a next target to be scanned the highest priority target from the prioritized target table 506. For example, consider the prioritized target table 106 given in Table 1. In this example, the scan manager 512 selects FileR.exe as the next target to be scanned because FileR.exe is the highest priority target indicated by the table. When the scan of FileR.exe is completed, it is removed from the table, and the highest priority target remaining in the table is selected as the next target. And so on. In this case, malware scanning is advantageously performed in a preemptive manner in order of priority, rather than in a non-prioritized order.

In a second case, the resource monitor 515 may detect that usage of resources by the computer system indicates a high-level of usage. For example, a set usage limit for one or more system resources (for example, the CPU, memory, or disk storage, or network bandwidth for in-the-cloud look-ups) is being exceeded by the computer system. In this case, the scan manager 512 may be configured to pause the malware scanning of targets during this period of high resource usage. This advantageously enables the malware scanning to be performed while reducing or minimizing intrusion or interference with other applications which a user may be actively running.

In a third case, the resource monitor 515 may detect an intermediate level of resource usage by the computer system. In this case, the scan manager 512 may select as a next target to be scanned the highest priority target under a threshold estimated scan time from the prioritized target table 506. For example, consider the prioritized target table 506 given in Table 1 and assume a threshold for the estimated scan time of fifty milliseconds. In this example, the scan manager 512 selects FileM.exe as the next target to be scanned because FileM.exe is the highest priority target with an estimated scan time under the threshold. FileR.exe and Fileb.vbs have higher priorities, but they have estimated scan times over the threshold. When the scan of FileM.exe is completed, it is removed from the table, and the highest priority target remaining in the table with estimated scan time under the threshold is selected as the next target. And so on. In this case, scanning of rapidly-scanned (usually small size) targets is performed in a prioritized order while avoiding undue intrusion or interference with other applications which a user may be actively running.

Advantageously, the above-described technique enables targets that are more likely to be malware to be scanned before targets that are less likely to be malware. Furthermore, this technique enables the performance of malware scanning in a manner which avoids taking up scarce system resources during periods of high resource usage.

Example Computer Apparatus and Network System

Figure 7:
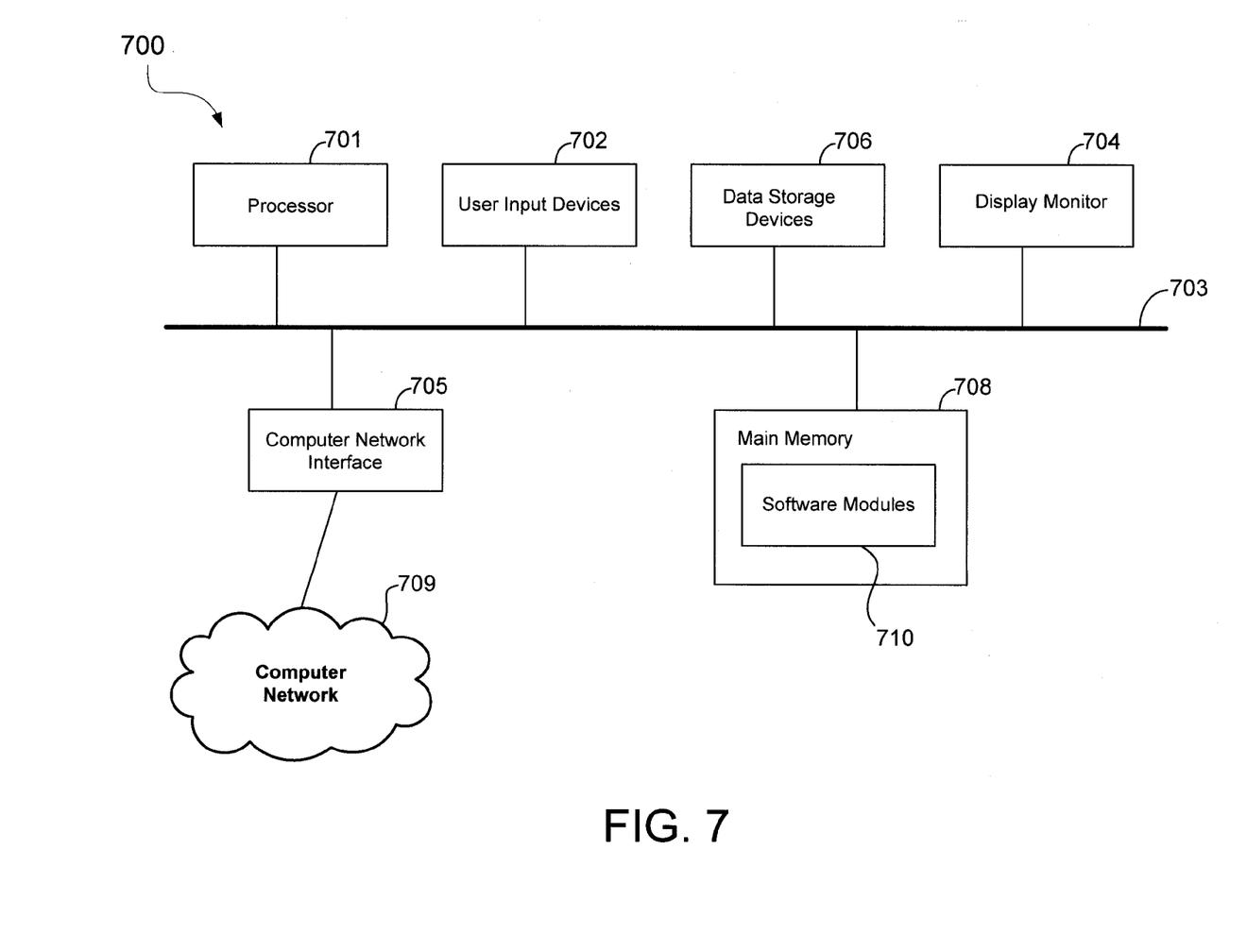
FIG. 7 shows a schematic diagram of a computer in accordance with an embodiment of the invention.

Referring now to FIG. 7, there is shown a schematic diagram of a computer 700 in accordance with an embodiment of the present invention. The computer 700 may be employed as a client computer 801 or security server computer 802 (see FIG. 8), for example. The computer 700 may have less or more components to meet the needs of a particular application. The computer 700 may include a processor 701, such as those from the Intel Corporation or Advanced Micro Devices, for example. The computer 700 may have one or more buses 703 coupling its various components. The computer 700 may include one or more user input devices 702 (e.g., keyboard, mouse), one or more data storage devices 706 (e.g., hard drive, optical disk, USB memory), a display monitor 704 (e.g., LCD, flat panel monitor, CRT), a computer network interface 705 (e.g., network adapter, modem), and a main memory 708 (e.g., RAM). The computer network interface 705 may be coupled to a computer network 709, which in this example includes the Internet.

In the example of FIG. 7, the main memory 708 includes software modules 710. The software modules 710 may comprise computer-readable program code (i.e., software) components of a client computer 801 or security server computer 802, for example. The software modules 710 may be loaded from the data storage device 706 to the main memory 708 for execution by the processor 701.

Figure 8:
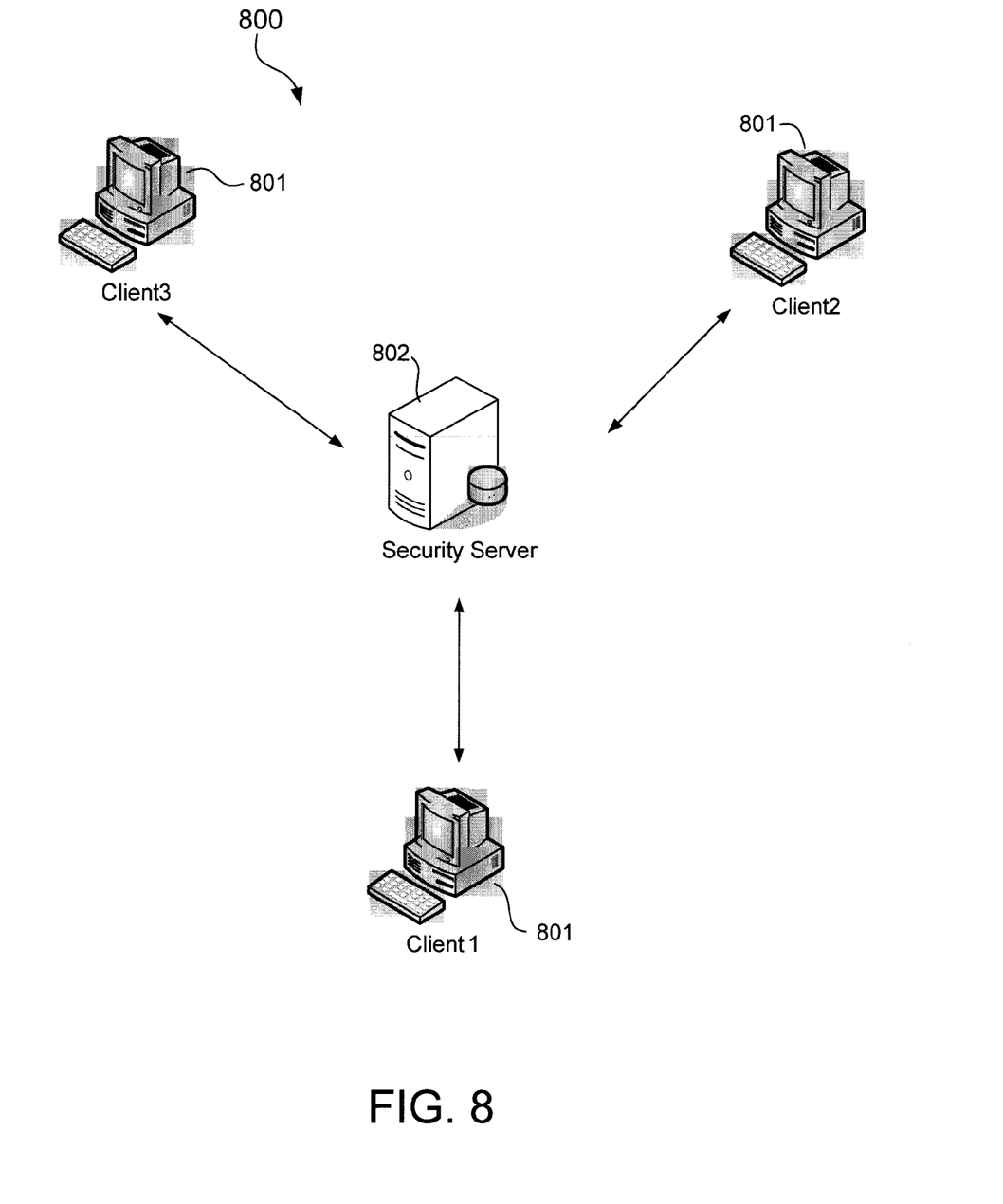
FIG. 8 schematically shows a system for scanning computer data for malicious codes in accordance with an embodiment of the invention.

FIG. 8 schematically shows a system 800 for scanning computer data for malicious codes in accordance with an embodiment of the present invention. The system 800 is configured to scan computer files in a data storage device, such as a hard disk drive, of a client computer 801.

In the example of FIG. 8, the system 800 includes one or more client computers 801 and one or more security server computers 802. Preferably, one security server computer 802 provides remote scanning services to two or more client computers 801. The client computers 801 and a security server computer 802 may communicate over a computer network, such as the Internet.

CONCLUSION

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

What is claimed is:

1. A computer-implemented method of preemptively scanning targets for malicious codes, the method comprising:

receiving input qualities regarding said targets, wherein the input qualities include at least data indicative of a percentage scan completion for a partially-scanned target;

applying a first computer-implemented procedure to generate a measure of priority for scanning of said targets using the input qualities;

selecting targets for preemptive scanning using said measure of priority; and storing the measure of priority for said targets in a prioritized target table, wherein the prioritized target table includes a first data field which identifies a target, a second data field which indicates a priority for the target, and a third data field which provides data relating to an estimated scan time for the target.

2. The computer-implemented method of claim 1, wherein the input qualities include a frequency at which a target has been accessed.

3. The computer-implemented method of claim 1, wherein the input qualities include a last time at which a target's content was modified.

4. The computer-implemented method of claim 1, wherein the input qualities include an estimation of system resources required to fetch and scan a target.

5. The computer-implemented method of claim 1, wherein the input qualities include age data for a target's content.

6. The computer-implemented method of claim 1, wherein the input qualities include source information for a target.

7. The computer-implemented method of claim 1, further comprising:

storing tracking data indicative of target-related events; and using the tracking data in determining said measure of priority.

8. The computer-implemented method of claim 1, further comprising:

receiving resource utilization inputs; and applying a second computer-implemented procedure to determine a system resource usage level using the resource utilization inputs; and performing malware scanning opportunistically based on the system resource usage level.

9. The computer-implemented method of claim 8, wherein said opportunistically-performed malware scanning includes selecting targets based on said measure of priority when the system resource usage level indicates a low-level of usage.

10. The computer-implemented method of claim 8, wherein said opportunistically-performed malware scanning includes pausing the malware scanning when the system resource usage level indicates a high-level of usage.

11. A computer-implemented method of preemptively scanning targets for malicious codes, the method comprising:
receiving input qualities regarding said targets, wherein the input qualities include at least data indicative of a percentage scan completion for a partially-scanned target;
applying a first computer-implemented procedure to generate a measure of priority for scanning of said targets using the input qualities;
selecting targets for preemptive scanning using said measure of priority;
receiving resource utilization inputs;
applying a second computer-implemented procedure to determine a system resource usage level using the resource utilization inputs; and
performing malware scanning opportunistically based on the system resource usage level,
wherein said opportunistically-performed malware scanning includes selecting targets having estimated scan times below a threshold when the system resource usage level indicates an intermediate-level of usage.

12. An apparatus configured to scan targets for malicious code, the apparatus comprising:
memory configured to store computer-readable code and data;
a processor configured to execute computer-readable code and to access said memory;
a scheduling engine configured to receive input qualities regarding said targets, wherein the input qualities include at least data indicative of a percentage scan completion for a partially-scanned target, and apply a first computer-implemented procedure to generate a measure of priority for scanning of said targets using the input qualities;
a scan manager configured to select targets for preemptive scanning using said measure of priority; and
a prioritized target table configured to store the measure of priority for said targets, wherein the prioritized target table includes a first data field which identifies a target, a second data field which indicates a priority for the target, and a third data field which provides data relating to an estimated scan time for the target.

13. The apparatus of claim 12, further comprising:
a resource monitor configured to receive resource utilization inputs and apply a second computer-implemented procedure to determine a system resource usage level using the resource utilization input,
wherein the scan manager is further configured to opportunistically schedule malware scanning based on the system resource usage level.

14. An apparatus configured to scan targets for malicious code, the apparatus comprising:
memory configured to store computer-readable code and data;
a processor configured to execute computer-readable code and to access said memory;
a scheduling engine configured to receive input qualities regarding said targets, wherein the input qualities include at least data indicative of a percentage scan completion for a partially-scanned target, and apply a first computer-implemented procedure to generate a measure of priority for scanning of said targets using the input qualities;
a scan manager configured to select targets for preemptive scanning using said measure of priority; and
a resource monitor configured to receive resource utilization inputs and apply a second computer-implemented procedure to determine a system resource usage level using the resource utilization input,
wherein the scan manager is further configured to opportunistically schedule malware scanning based on the system resource usage level, and
wherein the scan manager is configured to select targets based on said measure of priority when the system resource usage level indicates a low-level of usage, pause the malware scanning when the system resource usage level indicates a high-level of usage, and select targets having estimated scan times below a threshold when the system resource usage level indicates an intermediate-level of usage.

\* \* \* \* \*